United States Patent
Brooker et al.

(10) Patent No.: US 10,200,501 B1
(45) Date of Patent: Feb. 5, 2019

(54) PROGRAM CODE ALLOCATION BASED ON PROCESSOR FEATURES

(71) Applicant: Amazon Technologies, Inc., Seattle, WA (US)

(72) Inventors: Marc John Brooker, Seattle, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 14/971,116

(22) Filed: Dec. 16, 2015

(51) Int. Cl.
*G06F 15/173* (2006.01)
*H04L 29/08* (2006.01)
*H04L 29/06* (2006.01)
*H04L 12/24* (2006.01)
*G06F 8/60* (2018.01)

(52) U.S. Cl.
CPC ............... *H04L 67/34* (2013.01); *G06F 8/60* (2013.01); *H04L 41/14* (2013.01); *H04L 67/10* (2013.01); *H04L 67/42* (2013.01)

(58) Field of Classification Search
CPC ......... H04L 67/34; H04L 67/10; H04L 67/42; G06F 8/60
USPC ................................. 709/203, 204, 201, 202
See application file for complete search history.

(56) References Cited

U.S. PATENT DOCUMENTS

| | | | | |
|---|---|---|---|---|
| 6,179,489 B1 | 1/2001 | So et al. | | |
| 6,704,873 B1* | 3/2004 | Underwood | ............ | H04L 63/02 |
| | | | | 709/223 |
| 6,721,713 B1* | 4/2004 | Guheen | .................. | G06Q 50/01 |
| | | | | 705/1.1 |
| 6,907,546 B1* | 6/2005 | Haswell | .............. | G06F 11/3684 |
| | | | | 714/38.11 |
| 6,963,828 B1* | 11/2005 | McDonald | ............ | G06F 9/5061 |
| | | | | 703/1 |
| 7,035,919 B1* | 4/2006 | Lee | ..................... | H04L 67/1095 |
| | | | | 709/203 |
| 7,050,961 B1* | 5/2006 | Lee | ....................... | H04L 67/306 |
| | | | | 703/22 |
| 7,779,239 B2 | 8/2010 | Fischer et al. | | |
| 7,856,618 B2 | 12/2010 | Donovan et al. | | |
| 8,230,425 B2 | 7/2012 | Ahuja et al. | | |
| 9,256,222 B2* | 2/2016 | Blount | ............... | G05B 23/0221 |
| 9,892,394 B2* | 2/2018 | Wright | .................. | G06Q 10/08 |
| 2002/0196935 A1* | 12/2002 | Wenocur | ............. | G06Q 10/107 |
| | | | | 380/37 |

(Continued)

*Primary Examiner* — Thu Ha T Nguyen
(74) *Attorney, Agent, or Firm* — Robert C. Kowert; Meyertons, Hood, Kivlin, Kowert & Goetzel, P.C.

(57) ABSTRACT

Methods, systems, and computer-readable media for program code allocation based on processor features are disclosed. Analysis of program code is performed using static analysis and/or runtime analysis. The analysis determines one or more processor features invoked by the program code. One or more program execution servers are selected from a plurality of program execution servers based at least in part on the one or more processor features invoked by the program code. One or more selected program execution servers comprise the one or more processor features invoked by the program code, and an additional one or more of the program execution servers lack the one or more processor features invoked by the program code. The program code is executed using the one or more selected program execution servers.

20 Claims, 10 Drawing Sheets

(56) References Cited

U.S. PATENT DOCUMENTS

| | | | | |
|---|---|---|---|---|
| 2003/0036876 A1* | 2/2003 | Fuller, III | ........... | G06F 9/44505 |
| | | | | 702/127 |
| 2007/0103984 A1* | 5/2007 | Kavuri | ................. | G06F 3/0605 |
| | | | | 365/185.17 |
| 2007/0294663 A1* | 12/2007 | McGuire | ................... | G06F 8/45 |
| | | | | 717/108 |
| 2007/0294665 A1* | 12/2007 | Papakipos | ................ | G06F 8/45 |
| | | | | 717/119 |
| 2017/0118247 A1* | 4/2017 | Hussain | ................. | H04L 41/22 |
| 2018/0060106 A1* | 3/2018 | Madtha | ............... | G06F 9/45558 |

* cited by examiner

PROGRAM CODE ALLOCATION BASED ON PROCESSOR FEATURES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may execute programs on behalf of customers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for program code allocation based on processor features are described. Using the techniques described herein, program code may be analyzed and allocated to particular servers for execution based on the processor features invoked by the program code. The program code may received from clients of a code execution service and may include compiled or binary code for any suitable platform offered by the code execution service. A fleet of servers accessible to the code execution service may vary in terms of the processor features they offer. For example, a first one of the servers may include a processor that offers a particular processor feature (e.g., an advanced or newer feature), while a second one of the servers may lack that particular processor feature. The processor features may include central processing unit (CPU) features, graphics processing unit (GPU) features, and/or features of other accelerator hardware. Static analysis and/or runtime analysis of the program code to determine the processor features (if any) invoked by the code. The program code may then be allocated to one or more servers in the fleet based (at least in part) on the analysis. For example, if the program code is found to invoke a particular processor feature (e.g., an advanced or newer feature), then that program code may be assigned to a first one of the servers that includes a processor that offers that particular processor feature. Program code may also be assigned to particular servers for execution based (at least in part) on cost optimization, e.g., to allocate program code that does not invoke any advanced processor features to older servers. The allocation of program code to servers based on processor features may be performed without the knowledge of clients who provide the program code. In this manner, a code execution service may offer support for advanced processor features while also optimizing for cost.

Figure 1:
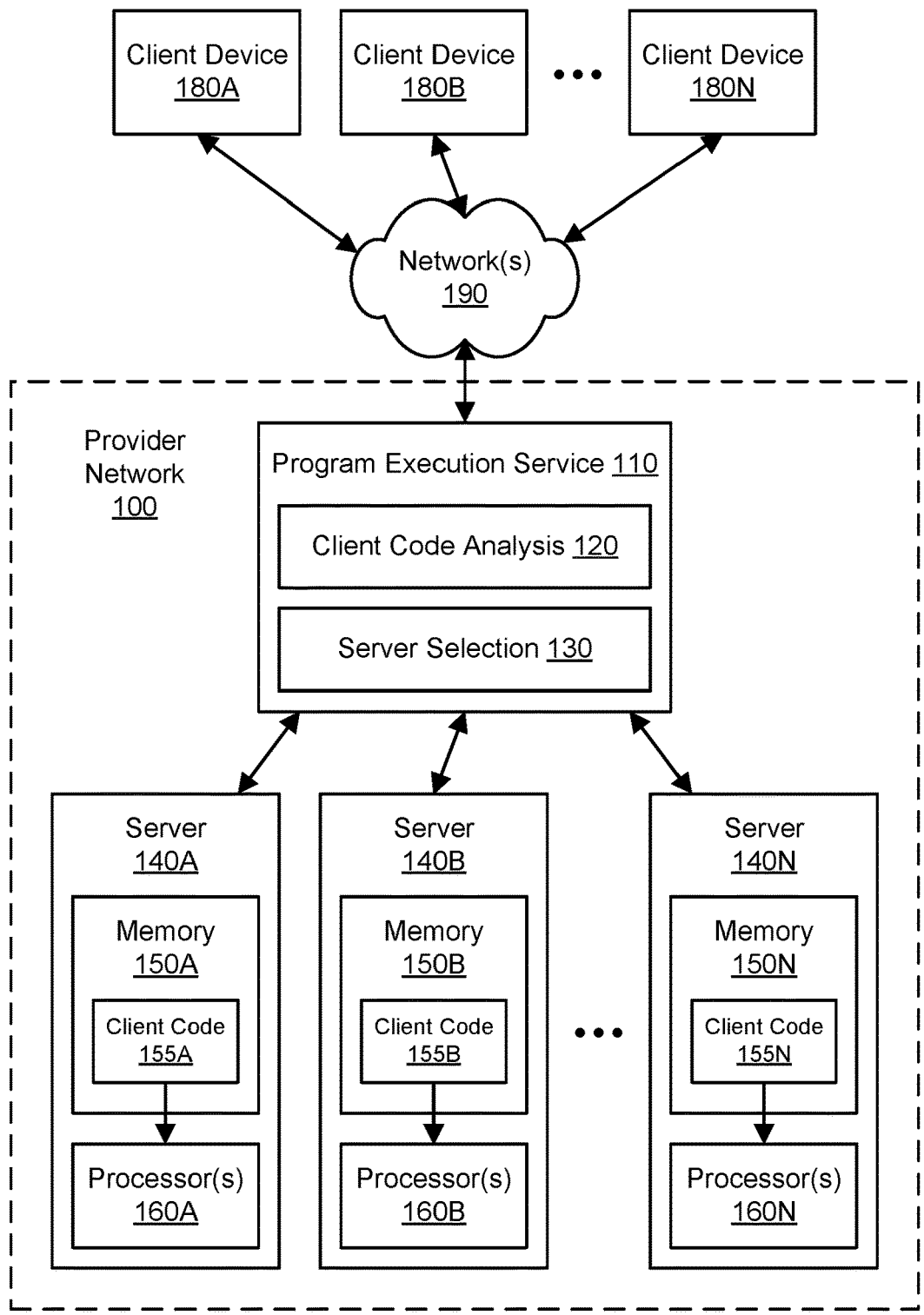
FIG. 1 illustrates an example system environment for program code allocation based on processor features, according to one embodiment.

FIG. 1 illustrates an example system environment for program code allocation based on processor features, according to one embodiment. Clients of a multi-tenant provider network 100 may use computing devices such as client devices 180A-180N to access a program execution service 110 and other resources offered by the provider network. The provider network may offers access to resources and services, such as the program execution service 110 and associated program execution servers 140A-140N, using multi-tenancy. The client devices 180A-180N may be coupled to the provider network 100 via one or more networks 190. Each of the client devices 180A-180N may represent one or more clients of the provider network 100 and/or program execution service 110. A client may represent a customer (e.g., an individual or group) of the provider network 100. Clients associated with (e.g., managing and/or operating) the client devices 180A-180N may provide the program execution service 110 with program code, and the client may intend that the program execution service execute the program code on behalf of the client using the computing resources (e.g., one or more program execution servers 140A-140N) associated with the program execution service.

Using the client devices 180A-180N, clients may submit program code to one or more computing devices that implement or execute the program execution service 110. The devices that execute the program execution service 110 may be implemented using the example computing device 3000 illustrated in FIG. 7. The program code may also be referred to herein as client code. The program code may be submitted using any suitable interface(s), including user interface(s) and/or programmatic interface(s) such as an application programming interface (API) to the program execution service 1100. A client may also submit any other suitable instructions or metadata associated with the program code or its execution, such as an indication of circumstances under which the program code should be executed (e.g., events or schedules that may trigger execution of the code) and/or how many times the program code should be executed, an indication of a client account associated with the program code, access credentials associated with resources (e.g., storage resources) to be accessed by the program code, and so on. In one embodiment, a client may not submit additional information (other than the code itself) tending to indicate or identify the type of processor(s) on which the program code should be executed.

The program code may comprise one or more packages, files, or other units. Typically, the program code may include a set of program instructions in a binary format, e.g., as compiled for a target platform. However, the program code may also include higher-level portions that are not yet compiled and that the client expects the program execution service to compile and execute. The target platform may represent a set of hardware on which the program code is intended to be executed, e.g., including one or more particular processors or families of processors. The target platform may also represent a particular operating system or family of operating systems with which the program code is intended to be executed.

The provider network 100 may include a fleet of program execution servers 140A-140N configured to execute program code on behalf of clients associated with client devices 180A-180N. The servers 140A-140N may also be referred to herein as code execution servers. The servers may be implemented using the example computing device 3000 illustrated in FIG. 7. In one embodiment, the fleet of servers 140A-140N may grow or shrink as individual servers are provisioned or deprovisioned, e.g., by the program execution service 110 using resources of the provider network 110. In one embodiment, the fleet of servers 140A-140N may grow or shrink as individual servers are added to or removed from a dedicated fleet by an administrator. Each of the servers 140A-140N may include a memory and one or more processors, such as memory 150A and processor(s) 160A for server 140A, memory 150B and processor(s) 160B for server 140B, and memory 150N and processor(s) 160N for server 140N. The servers 140A-140N may be heterogeneous in terms of the processors 160A-160N. For example, the processors 160A-160N may include different versions of the same instruction set architecture (ISA) having different processor features. The processors 160A-160N may include central processing units (CPUs), one or more graphics processing units (GPUs), one or more other co-processors, one or more hardware-based accelerators external to a CPU, one or more offload engines (e.g., a hardware security module, crypto-offload module, compression offload module, and so on), and/or other suitable elements of computing hardware.

The processors 160A-160N may vary in terms of the advanced processor features they offer. The advanced processor features, also referred to herein as processor features, may include any suitable features offered by any processors 160A-160N in the program execution servers 140A-140N managed by the program execution service 110. Typically, the processor features may include newer features in a family of processors, e.g., features that may not be found in all versions of a particular family of processors. A processor feature may represent a particular functionality or set of functionalities offered to program code by an element of computing hardware. Within the fleet of program execution servers 140A-140N managed by the program execution service 110, any of the advanced features may be present in one or more program execution servers and lacking in one or more program execution servers. The processors having advanced features may include one or more central processing units (CPUs), one or more graphics processing units (GPUs), one or more other co-processors, one or more hardware-based accelerators external to a CPU, one or more offload engines (e.g., a hardware security module, crypto-offload module, compression offload module, and so on), and/or other suitable elements of computing hardware. For example, advanced CPU features may include the Advanced Vector Extensions (AVX) to the x86 instruction set architecture (ISA), the related AVX2 or AVX-512 extensions, the Advanced Encryption Standard New Instructions (AES-NI) extension to the x86 ISA, and/or any other suitable extensions to existing ISAs. Each of the processor features may be associated with a particular instruction set. In some circumstances, the mere presence of a co-processor, accelerator, or offload engine external to the CPU may be considered a processor feature.

The program execution service 110 may identify advanced processor features invoked by program code and allocate the program code to particular ones of the servers 140A-140N based (at least in part) on those features. Accordingly, the program execution service 110 may include a component for client code analysis 120 and a component for server selection 130. The client code analysis 120 may perform automatic (e.g., without needing user input beyond an initial configuration stage) and/or programmatic (e.g., according to execution of program instructions) analysis of program code. Using the client code analysis 120, static analysis of program code may be performed to identify any advanced processor features that the code invokes. The static analysis may be performed prior to executing the program code on any of the servers 140A-140N or on any other computing devices associated with the program execution service 110. The static analysis may use disassembly techniques on the program code and attempt to find opcodes or other instructions in the instruction sets associated with any of the advanced processor features offered by the program execution servers 140A-140N. In this manner, the static analysis may determine whether the program code invokes one or more processor features, and if so, which processor features are invoked by the program code. Using the server selection component 130, the program execution service may select one or more of the servers 140A-140N for each set of program code. The program execution service 110 may then cause the program code to be executed using the selected server(s). As shown in the example of FIG. 1, program code 155A may be allocated to server 140A, program code 155B may be allocated to server 140B, and program code 155N may be allocated to server 140N.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 7), needed to implement and distribute the infrastructure and services offered by the provider network 100. In some embodiments, provider network 100 may provide computing resources, such as program execution service 110 and servers 140A-140N; storage services, such as a block-based storage service, key-value based data stores or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 7.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. In one embodiment, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 7:
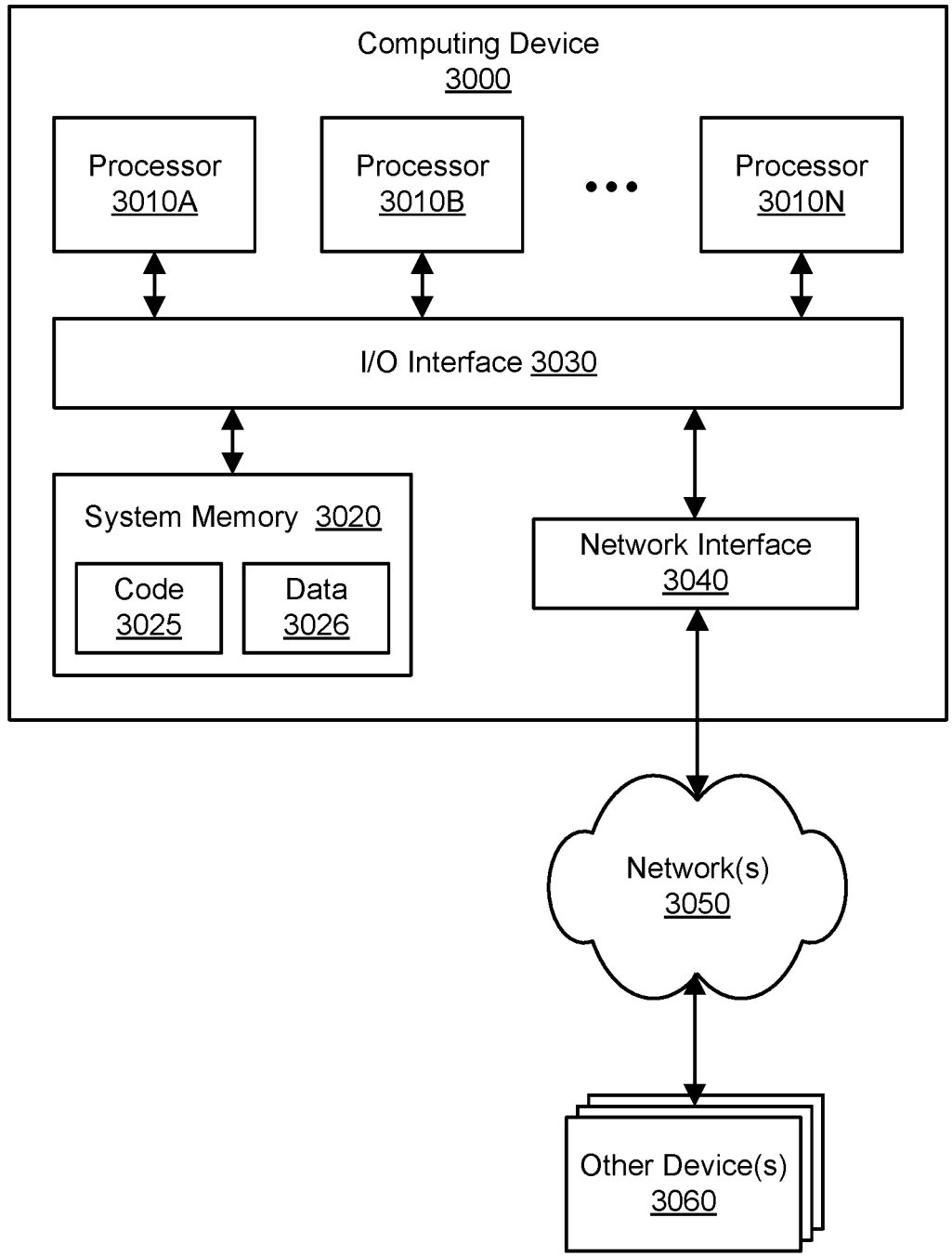
FIG. 7 illustrates an example computing device that may be used in some embodiments.

The provider network 100 may include a plurality of computing devices, any of which may be implemented by the example computing device 3000 illustrated in FIG. 7. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the program execution service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although program execution servers 140A and 140B through 140N are shown for purposes of example and illustration, it is contemplated that different quantities and configurations of program execution servers may be used. Additionally, although three client devices 180A, 180B, and 180N are shown for purposes of example and illustration, it is contemplated that different quantities and configurations of client devices may be used. Aspects of the functionality described herein may be performed, at least in part, by components outside of the provider network 100.

Figure 2A:
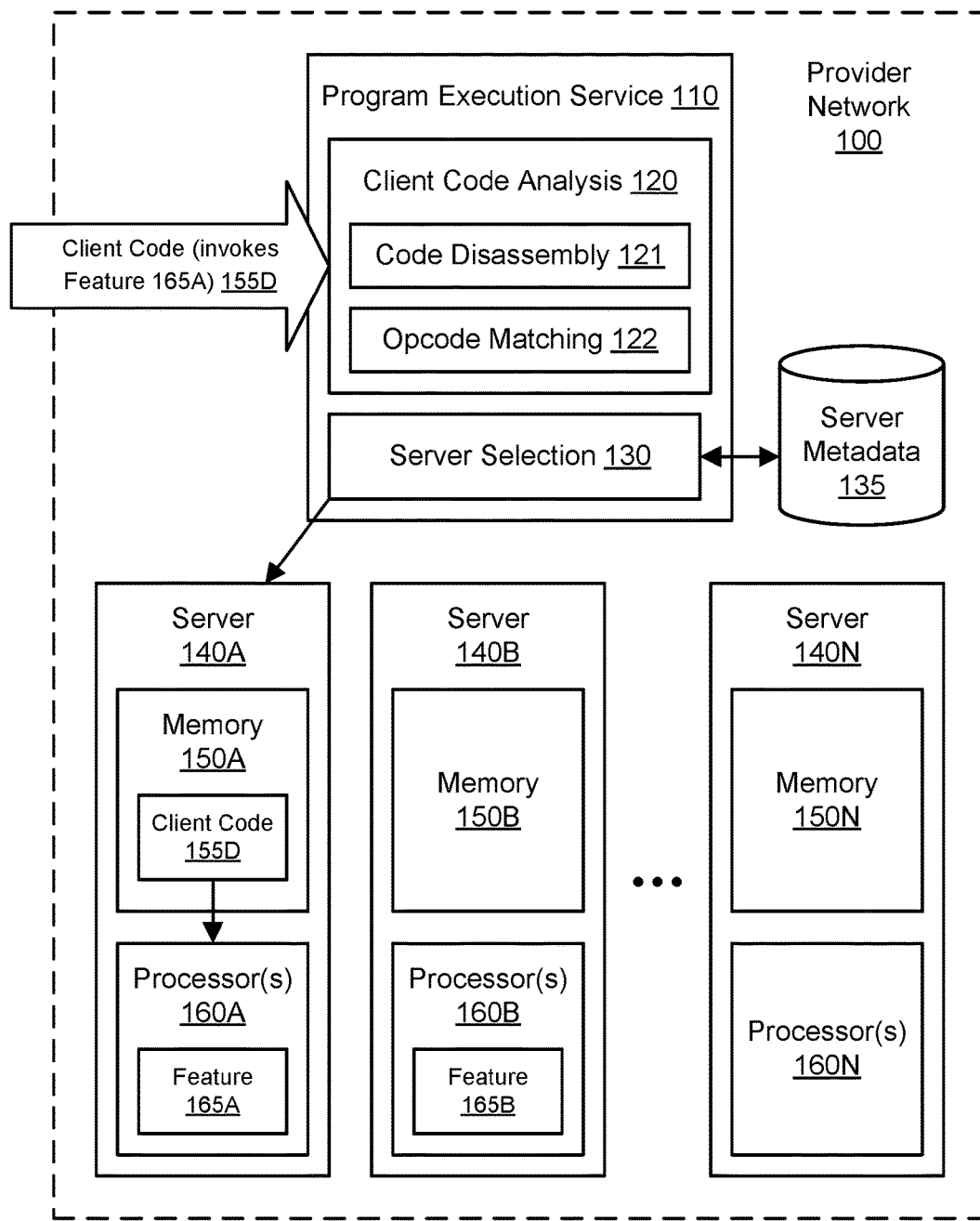
FIG. 2A through FIG. 2C illustrate further aspects of the example system environment for program code allocation based on processor features, including selection of particular servers based on particular features invoked by client code, according to one embodiment.
Figure 2B:
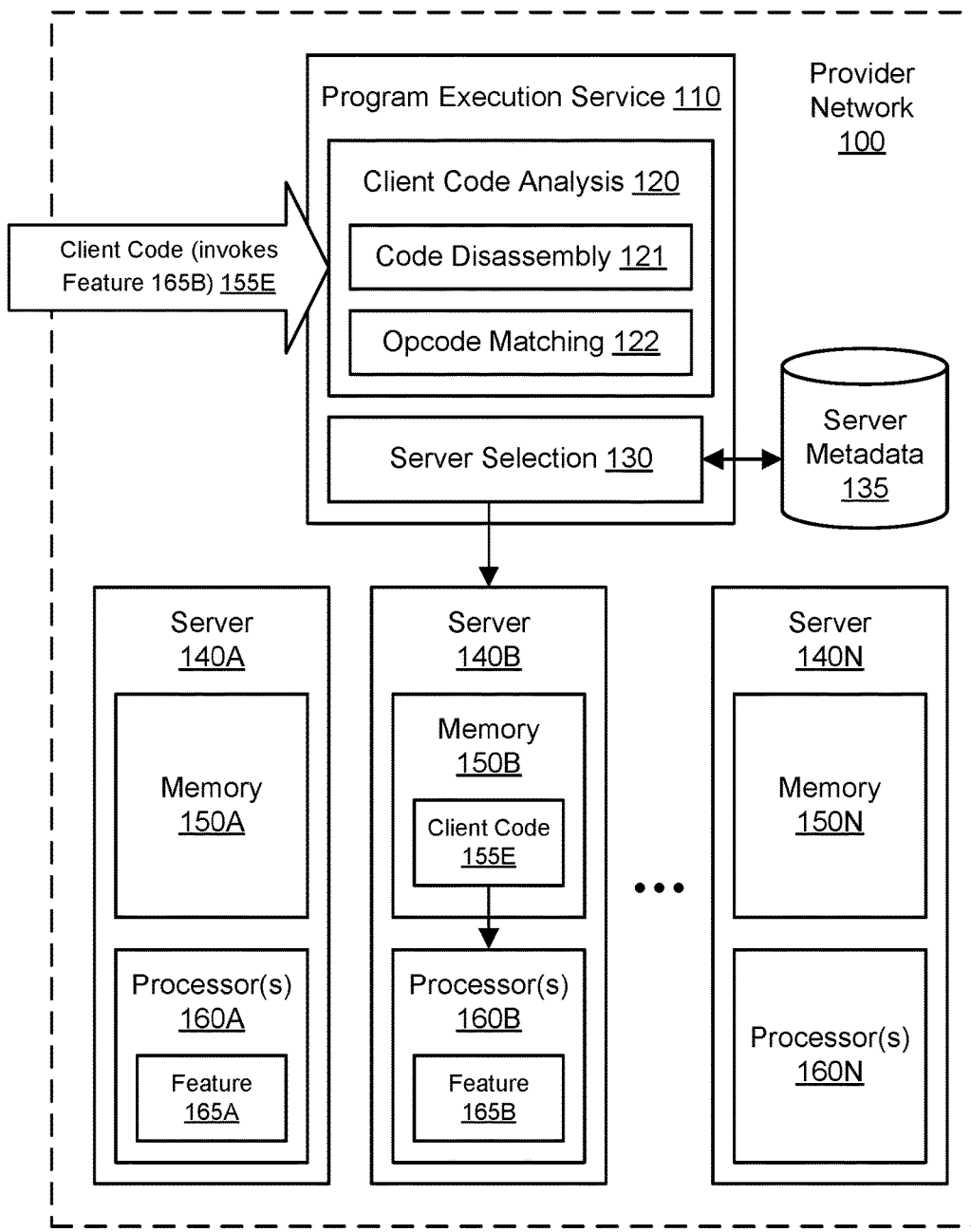
Figure 2C:
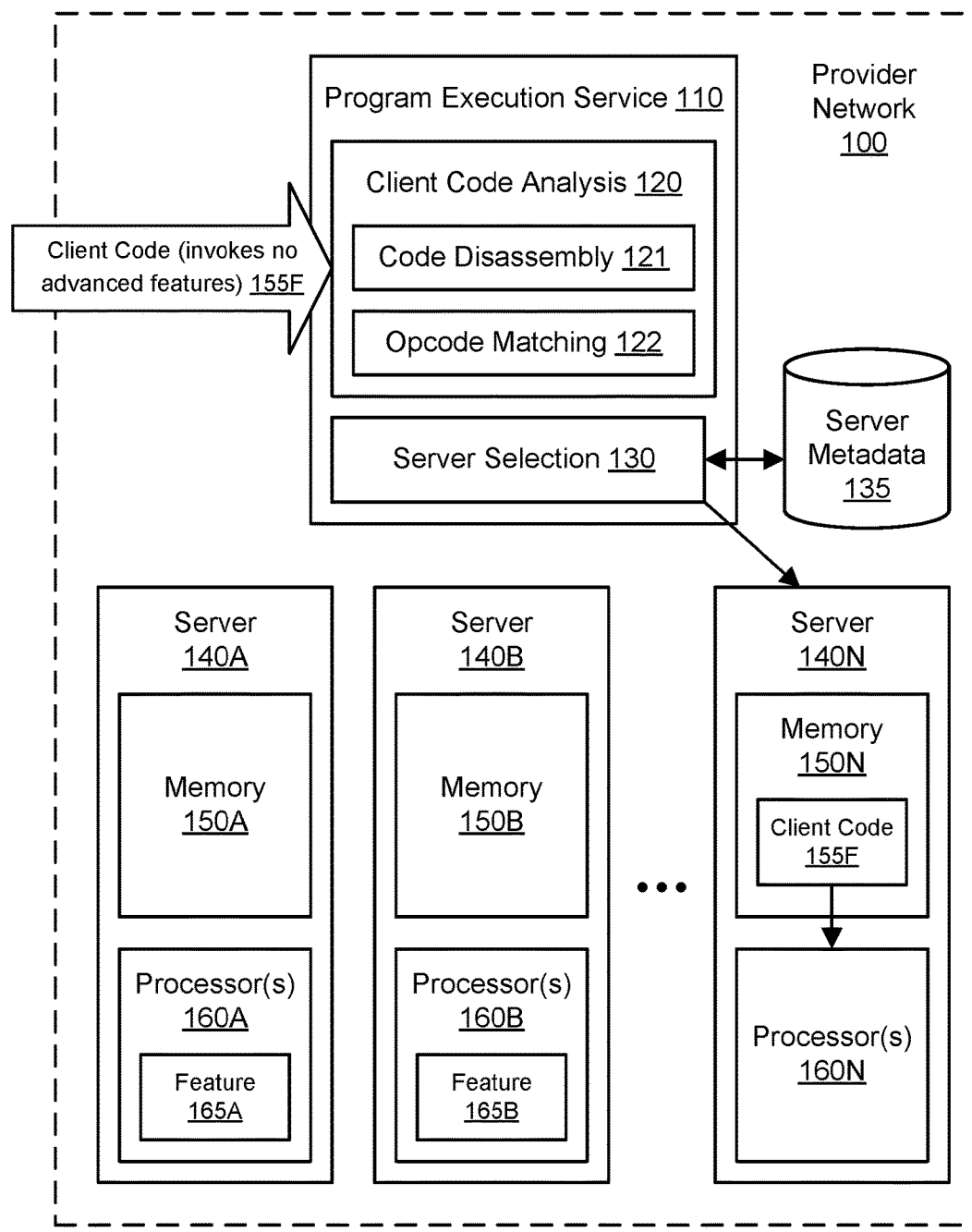

FIG. 2A through FIG. 2C illustrate further aspects of the example system environment for program code allocation based on processor features, including selection of particular servers based on particular features invoked by client code, according to one embodiment. As shown in the example of FIG. 2A, client code 155D may be received by the program execution service 110. In one embodiment, the client code analysis component 120 may use a code disassembly component 121 on the program code 155D. In one embodiment, the client code analysis component 120 may also use an opcode matching component 122 to attempt to find, in the disassembled code, opcodes or other instructions in the instruction sets associated with any of the advanced processor features offered by the program execution servers 140A-140N. In one embodiment, the client code analysis component 120 may detect instructions such as CPU ID instructions that indicate a particular version of hardware on which the code should be run. In this manner, the client code analysis component 120 may determine whether the program code 155D invokes one or more processor features, and if so, which processor features are invoked by the program code.

For example, the client code analysis 120 may determine that the client code 155D invokes a processor feature 165A. Invoked features may not necessarily be used in any given execution of the program code 155D, e.g., if the feature 165A is invoked in a branch or path that is not always taken. Similarly, the program code 155D may have been compiled such that it will successfully run on hardware having the advanced processor feature(s) or hardware lacking the advanced processor feature(s), although the program code may run more slowly in the latter case. However, the program code 155D may generally be able to take advantage (under at least some circumstances that may potentially occur) of an advanced feature 165A that it is said to invoke.

Based on the determination that the code 155D invokes the feature 165A, the server selection component 130 may select one or more of the program execution servers 140A-140N in the fleet. In one embodiment, the server selection component 130 may refer to a data store that maintains server metadata 135, e.g., indicating the advanced processor features (if any) offered by each of the servers 140A-140N. The server metadata 135 may also include estimated costs of operation associated with individual servers 140A-140N, e.g., to be used for cost optimization when allocating program code to program execution servers. As shown in the example of FIG. 2A, the server 140A may be selected for execution of the client code 155D. The server 140A may be selected based (at least in part) on the processor feature 165A invoked by the program code 155D, such that the selected server 140A may be selected because it includes hardware offering the processor feature 165A invoked by the program code 155D. One or more other program execution servers in the heterogeneous fleet, such as servers 140B and 140N, may lack the processor feature 165A invoked by the program code 155D and may thus not be selected for execution of the program code. The server 140A may also be selected based (at least in part) on other suitable criteria, including availability, performance optimization, cost optimization, and/or client budget management. The client may not be informed of the type of server selected for execution of the program code 155D or the basis on which the server 140A is selected.

As shown in the example of FIG. 2B, client code 155E may be received by the program execution service 110. The client code 155E may be received from the same client or a different client as the client code 155D. In one embodiment, the client code analysis component 120 may use the code disassembly component 121 on the program code 155E. In one embodiment, the client code analysis component 120 may also use an opcode matching component 122 to attempt to find, in the disassembled code, opcodes or other instructions in the instruction sets associated with any of the advanced processor features offered by the program execution servers 140A-140N. In this manner, the client code analysis component 120 may determine whether the program code 155E invokes one or more processor features, and if so, which processor features are invoked by the program code.

For example, the client code analysis 120 may determine that the client code 155E invokes a processor feature 165B. Invoked features may not necessarily be used in any given execution of the program code 155E, e.g., if the feature 165B is invoked in a branch or path that is not always taken. Similarly, the program code 155E may have been compiled such that it will successfully run on hardware having the advanced processor feature(s) or hardware lacking the advanced processor feature(s), although the program code may run more slowly in the latter case. However, the program code 155E may generally be able to take advantage (under at least some circumstances that may potentially occur) of an advanced feature 165B that it is said to invoke.

Based on the determination that the code 155E invokes the feature 165B, the server selection component 130 may select one or more of the program execution servers 140A-140N in the fleet. In one embodiment, the server selection component 130 may refer to a data store that maintains server metadata 135, e.g., indicating the advanced processor features (if any) offered by each of the servers 140A-140N. The server metadata 135 may also include estimated costs of operation associated with individual servers 140A-140N, e.g., to be used for cost optimization when allocating program code to program execution servers. As shown in the example of FIG. 2B, the server 140B may be selected for execution of the client code 155E. The server 140B may be selected based (at least in part) on the processor feature 165B invoked by the program code 155E, such that the selected server 140B may be selected because it includes hardware offering the processor feature 165B invoked by the program code 155E. One or more other program execution servers in the heterogeneous fleet, such as servers 140A and 140N, may lack the processor feature 165B invoked by the program code 155E and may thus not be selected for execution of the program code. The server 140B may also be selected based (at least in part) on other suitable criteria, including availability, performance optimization, cost optimization, and/or client budget management. The client may not be informed of the type of server selected for execution of the program code 155E or the basis on which the server 140B is selected.

As shown in the example of FIG. 2C, client code 155F may be received by the program execution service 110. The client code 155F may be received from the same client or a different client as the client code 155D and/or 155E. In one embodiment, the client code analysis component 120 may use the code disassembly component 121 on the program code 155F. In one embodiment, the client code analysis component 120 may also use an opcode matching component 122 to attempt to find, in the disassembled code, opcodes or other instructions in the instruction sets associated with any of the advanced processor features offered by the program execution servers 140A-140N. In this manner, the client code analysis component 120 may determine whether the program code 155F invokes one or more processor features, and if so, which processor features are invoked by the program code.

For example, the client code analysis 120 may determine that the client code 155F invokes no advanced processor features. Based on the determination that the code 155F invokes no advanced processor features, the server selection component 130 may select one or more of the program execution servers 140A-140N in the fleet. In one embodiment, the server selection component 130 may refer to a data store that maintains server metadata 135, e.g., indicating the estimated costs of operation associated with individual servers 140A-140N, e.g., to be used for cost optimization when allocating program code to program execution servers. As shown in the example of FIG. 2C, the server 140N may be selected for execution of the client code 155F. The selected server 140N may lack one or more advanced processor features offered by other servers in the fleet. Different servers in the fleet may be associated with different cost characteristics, and the server 140N may be selected based (at least in part) on cost optimization. For example, the selected server 140N may generally be less expensive to operate or maintain than other servers in the fleet (e.g., servers 140A and 140B including processors offering advanced features). The server 140N may also be selected based (at least in part) on other suitable criteria, including availability, performance optimization, and/or client budget management. The client may not be informed of the type of server(s) selected for execution of the program code or the basis on which the server(s) are selected.

Figure 3:
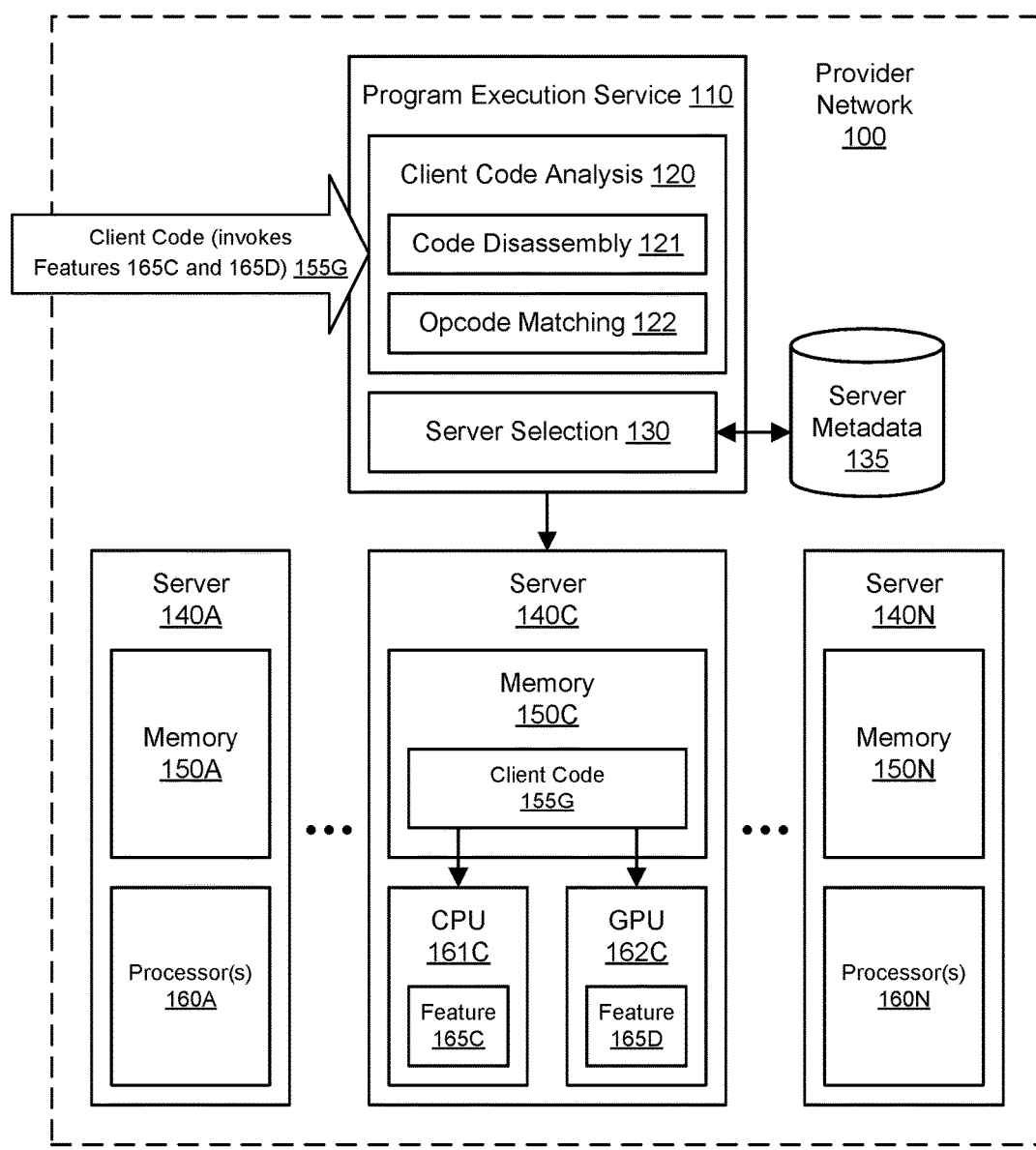
FIG. 3 illustrates further aspects of the example system environment for program code allocation based on processor features, including selection of a particular server based on particular features of multiple types of processors invoked by client code, according to one embodiment.

FIG. 3 illustrates further aspects of the example system environment for program code allocation based on processor features, including selection of a particular server based on particular features of multiple types of processors invoked by client code, according to one embodiment. In one embodiment, a program execution server in the fleet 140A-140N may offer multiple advanced processor features for one or more processors. As shown in the example of FIG. 3, program execution server 140C may include a CPU 161C with processor feature 165C and a GPU 162C with processor feature 165D. In one embodiment, the mere presence of a GPU or other co-processor or accelerator (external to a CPU) or offload engine may be considered an advanced processor feature of a server.

Client code 155G may be received by the program execution service 110. In one embodiment, the client code analysis component 120 may use the code disassembly component 121 on the program code 155G. In one embodiment, the client code analysis component 120 may also use an opcode matching component 122 to attempt to find, in the disassembled code, opcodes or other instructions in the instruction sets associated with any of the advanced processor features offered by the program execution servers 140A-140N. In this manner, the client code analysis component 120 may determine whether the program code 155G invokes one or more processor features, and if so, which processor features are invoked by the program code.

For example, the client code analysis 120 may determine that the client code 155G invokes processor features 165C and 165D. Invoked features may not necessarily be used in any given execution of the program code 155G, e.g., if either of the features 165C and 165D is invoked in a branch or path that is not always taken. Similarly, the program code 155G may have been compiled such that it will successfully run on hardware having the advanced processor feature(s) or hardware lacking the advanced processor feature(s), although the program code may run more slowly in the latter case. However, the program code 155G may generally be able to take advantage (under at least some circumstances that may potentially occur) of the advanced features 165C and 165D that it is said to invoke.

Based on the determination that the code 155G invokes the features 165C and 165D, the server selection component 130 may select one or more of the program execution servers 140A-140N in the fleet. In one embodiment, the server selection component 130 may refer to a data store that maintains server metadata 135, e.g., indicating the advanced processor features (if any) offered by each of the servers 140A-140N. The server metadata 135 may also include estimated costs of operation associated with individual servers 140A-140N, e.g., to be used for cost optimization when allocating program code to program execution servers. As shown in the example of FIG. 3, the server 140C may be selected for execution of the client code 155G. The server 140C may be selected based (at least in part) on the processor features 165C and 165D invoked by the program code 155G, such that the selected server 140C may be selected because it includes a CPU 161C offering the processor feature 165C and a GPU 162C offering the processor feature 165D invoked by the program code 155G. One or more other program execution servers in the heterogeneous fleet, such as servers 140A and 140N, may lack both of the processor features 165C and 165D invoked by the program code 155G and may thus not be selected for execution of the program code. The server 140C may also be selected based (at least in part) on other suitable criteria, including availability, performance optimization, cost optimization, and/or client budget management. The client may not be informed of the type of server selected for execution of the program code 155G or the basis on which the server 140C is selected.

In one embodiment, client code may be partitioned among multiple processors, co-processors, offload engines, or other processing components on a server. For example, one portion of client code 155G may be allocated to and executed using CPU 161C, and another portion of client code 155G may be allocated to and executed using GPU 162C. The client code may be partitioned based (at least in part) on a mapping between the advanced feature(s) invoked by the code and the advanced feature(s) offered by the hardware elements. For example, the portion of client code 155G allocated to CPU 161C may invoke the advanced feature 165C of that processor, and the portion of client code 155G allocated to GPU 162C may invoke the advanced feature 165D of that processor. Similarly, if a particular server includes multiple processors of the same processor type (e.g., multiple CPUs that offer different features, multiple GPUs that offer different features, and so on), then client code allocated to that server may be partitioned among those processors based on the advanced features invoked by the code. If program code includes multiple packages or interconnected services or other units that can be executed independently, then the program code may be partitioned among multiple connected servers and/or within multiple processing elements within a server.

Figure 4:
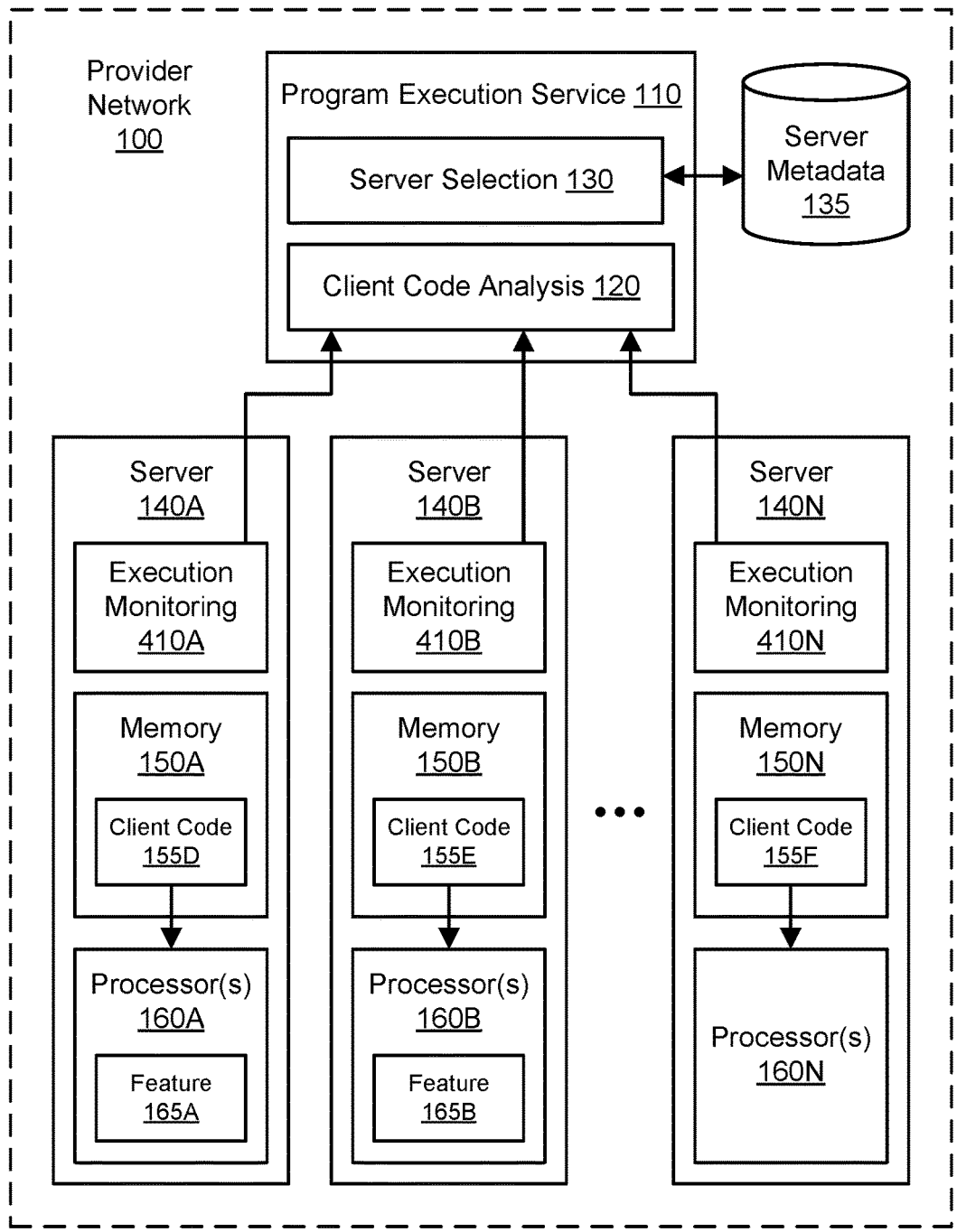
FIG. 4 illustrates further aspects of the example system environment for program code allocation based on processor features, including runtime analysis of program execution, according to one embodiment.

FIG. 4 illustrates further aspects of the example system environment for program code allocation based on processor features, including runtime analysis of program execution, according to one embodiment. As discussed above, the servers 140A-140N may be used to execute program code provided by clients of the program execution service 110. As shown in the example of FIG. 4, server 140A may execute client code 155A, server 140B may execute client code 155E, and server 140N may execute client code 155F. Execution of the program code may be performed under circumstances indicated by the client, e.g., when triggered according to a schedule or by the occurrence of one or more events. The execution of the program code may or may not actually invoke any of the advanced processor features of the one or more selected program execution servers. For example, features invoked in the program code may not necessarily be used in any given execution of the program code, e.g., if the feature is invoked in a branch or path that is not always taken. In one embodiment, results or outcomes of the execution may be logged or otherwise provided to the client.

Each of the servers 140A-140N may include an execution monitoring component, such as execution monitoring component 410A for server 140A, execution monitoring component 410B for server 140B, and execution monitoring component 410N for server 140N. In one embodiment, the execution of the program code may be monitored on a particular server using the execution monitoring component associated with that server. For example, the execution monitoring component may determine which advanced processor features are actually invoked by program code based on runtime execution of that code. Based (at least in part) on the execution monitoring 410A-410N and subsequent client code analysis, a code migration component of the program execution service 110 may migrate the execution of a particular set of program code from one of the servers 140A-140N to another. For example, if an advanced feature is never actually invoked after a suitably large number of executions, then the program code may be migrated to a less expensive server (that lacks the advanced feature) for purposes of cost optimization. In one embodiment, new sets of program code may initially be allocated to more feature-rich servers without performing static analysis, and some sets of program code may be migrated to less feature-rich servers based on runtime execution monitoring for purposes of cost optimization.

Figure 5:
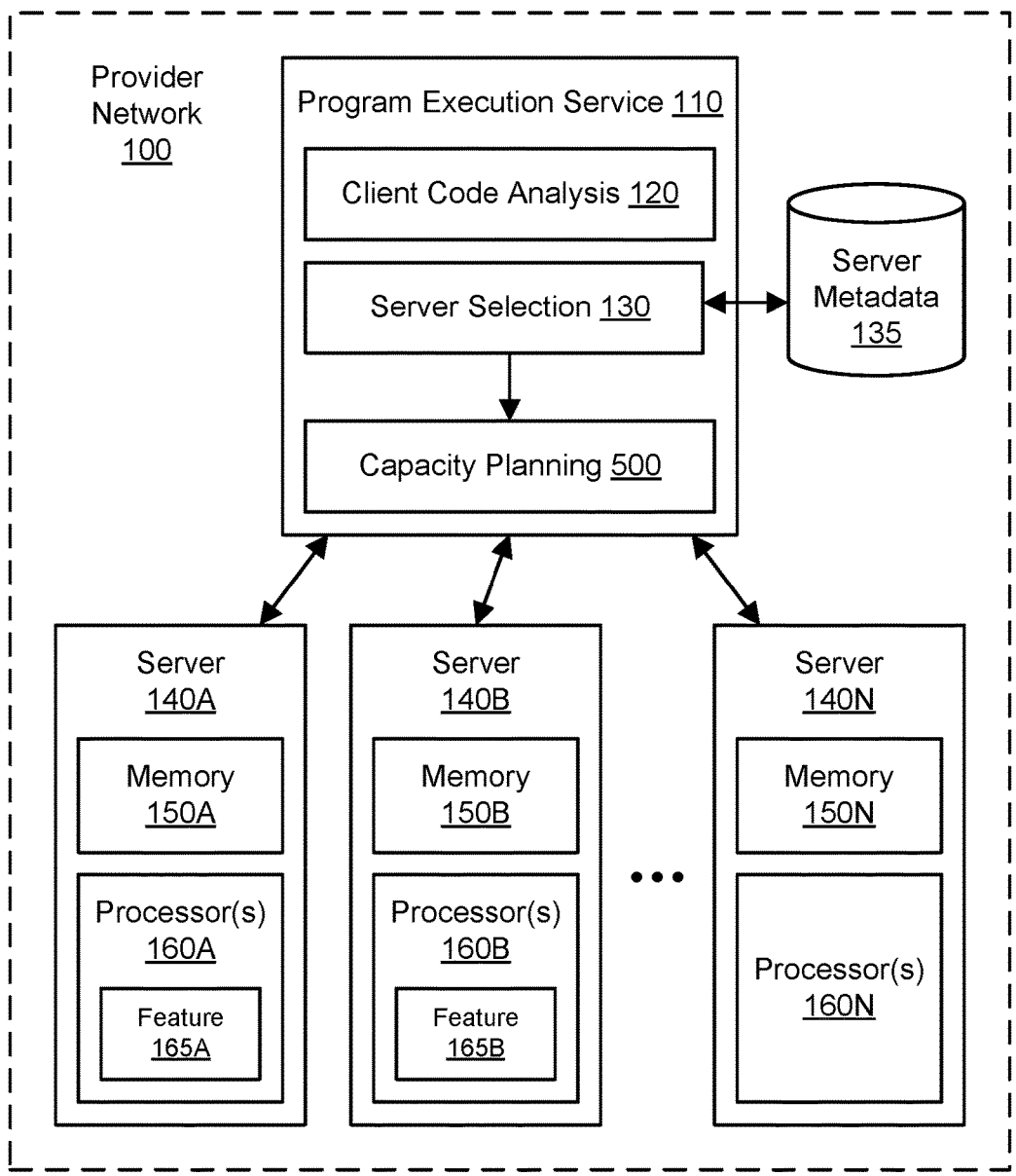
FIG. 5 illustrates further aspects of the example system environment for program code allocation based on processor features, including capacity planning based on server selection, according to one embodiment.

FIG. 5 illustrates further aspects of the example system environment for program code allocation based on processor features, including capacity planning based on server selection, according to one embodiment. In one embodiment, the decisions made by the server selection component 130 may be used by a capacity planning component 500 of the program execution service 110. The capacity planning component 500 may generate (e.g., automatically and programmatically) recommendations for modifying the fleet of program execution servers 140A-140N, e.g., to add or remove servers. For example, if sets of program code often invoke the advanced feature 165A, then the capacity planning component 500 may recommend that an administrator of the provider network 100 add more servers that offer that feature to the fleet. Conversely, if sets of program code rarely invoke the advanced feature 165A, then the capacity planning component 500 may recommend that an administrator of the provider network 100 not add more servers that offer that feature to the fleet. In one embodiment, the capacity planning 500 may place orders (e.g., automatically and programmatically) for additional servers or hardware components based on its analysis.

Figure 6A:
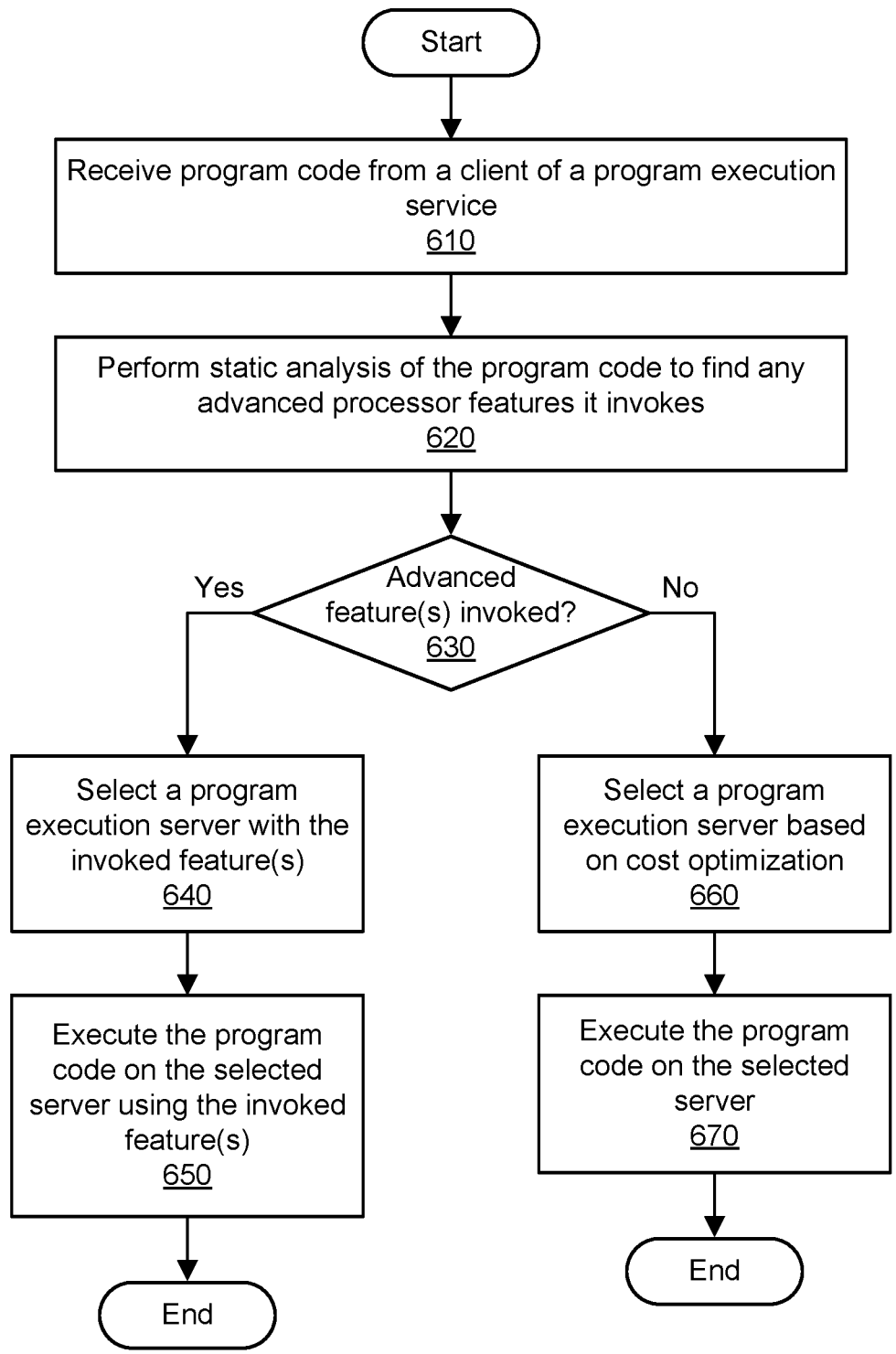
FIGS. 6A and 6B are flowcharts illustrating methods for program code allocation based on processor features, according to one embodiment.

FIG. 6A is a flowchart illustrating a method for program code allocation based on processor features, according to one embodiment. As shown in 610, program code may be received by a program execution service from a client of the program execution service. The client may represent a customer (e.g., an individual or group) of a multi-tenant provider network that offers access to resources and services, such as the program execution service and associated computing resources. The client may intend that the program execution service execute the program code on behalf of the client using the computing resources (e.g., one or more program execution servers) associated with the program execution service. The client may use a client device to submit the program code to one or more computing devices associated with the program execution service. The program code may also be referred to herein as client code. The program code may be submitted using any suitable interface(s), including user interface(s) and/or programmatic interface(s) such as an application programming interface (API) to the program execution service. The client may also submit any other suitable instructions or metadata associated with the program code or its execution, such as an indication of circumstances under which the program code should be executed (e.g., events or schedules that may trigger execution of the code) and/or how many times the program code should be executed, an indication of a client account associated with the program code, access credentials associated with resources (e.g., storage resources) to be accessed by the program code, and so on. In one embodiment, the client may not submit additional information tending to indicate or identify the type of processor(s) on which the program code should be executed.

The program code may comprise one or more packages, files, or other units. Typically, the program code may include a set of program instructions in a binary format, e.g., as compiled for a target platform. However, the program code may also include higher-level portions that are not yet compiled and that the client expects the program execution service to compile and execute. The target platform may represent a set of hardware on which the program code is intended to be executed, e.g., including one or more particular processors or families of processors. The target platform may also represent a particular operating system or family of operating systems with which the program code is intended to be executed.

As shown in 620, static analysis of program code may be performed to identify any advanced processor features that the code invokes. The static analysis may be performed prior to executing the program code on any of the computing devices associated with and managed by the program execution service. The advanced processor features, also referred to herein as processor features, may include any suitable features offered by any processors in the program execution servers managed by the program execution service. Typically, the processor features may include newer features in a family of processors, e.g., features that may not be found in all versions of a particular family of processors. Within the fleet of program execution servers managed by the program execution service, any of the advanced features sought by the static analysis may be present in one or more program execution servers and lacking in one or more program execution servers. The processors having advanced features may include one or more central processing units (CPUs), one or more graphics processing units (GPUs), one or more other co-processors, one or more hardware-based accelerators external to a CPU, one or more offload engines (e.g., a hardware security module, crypto-offload module, compression offload module, and so on), and/or other suitable elements of computing hardware. For example, advanced CPU features may include the Advanced Vector Extensions (AVX) to the x86 instruction set architecture (ISA), the related AVX2 or AVX-512 extensions, the Advanced Encryption Standard New Instructions (AES-NI) extension to the x86 ISA, and/or any other suitable extensions to existing ISAs. Each of the processor features may be associated with a particular instruction set. The static analysis may use disassembly techniques on the program code and attempt to find opcodes or other instructions in the instruction sets associated with any of the advanced processor features offered by the program execution servers. In this manner, the static analysis may determine whether the program code invokes one or more processor features, and if so, which processor features are invoked by the program code.

As shown in 630, it may be determined whether any advanced features are invoked by the program code. Invoked features may not necessarily be used in any given execution of the program code, e.g., if the feature is invoked in a branch or path that is not always taken. Similarly, the program code may have been compiled such that it will successfully run on hardware having the advanced processor feature(s) or hardware lacking the advanced processor feature(s), although the program code may run more slowly in the latter case. However, the program code may generally be able to take advantage (under at least some circumstances that may potentially occur) of an advanced feature that it is said to invoke.

If the program code invokes one or more advanced processor features, then as shown in 640, one or more program execution servers may be selected from a fleet of program execution servers for execution of the program code. The program execution servers may also be referred to as code execution servers. The server(s) may be selected based (at least in part) on the one or more processor features invoked by the program code, such that the selected server(s) may include hardware offering the one or more processor features invoked by the program code. As discussed above, one or more other program execution servers in the heterogeneous fleet may lack the one or more processor features invoked by the program code and may thus not be selected for execution of the program code. The server(s) may also be selected based (at least in part) on other suitable criteria, including availability, performance optimization, cost optimization, and/or client budget management. The client may not be informed of the type of server(s) selected for execution of the program code or the basis on which the server(s) are selected.

As shown in 650, the program code may be sent or otherwise provided to the selected server(s) and executed using the selected server(s). Execution of the program code may be performed under circumstances indicated by the client, e.g., when triggered according to a schedule or by the occurrence of one or more events. The execution of the program code may or may not actually invoke any of the advanced processor features of the one or more selected program execution servers. For example, features invoked in the program code may not necessarily be used in any given execution of the program code, e.g., if the feature is invoked in a branch or path that is not always taken. In one embodiment, results or outcomes of the execution may be logged or otherwise provided to the client. In one embodiment, the execution of the program code may be monitored, and the code may be migrated to one or more other program execution servers based on the monitoring. For example, if an advanced feature is never actually invoked after a suitably large number of executions, then the program code may be migrated to a less expensive server (that lacks the advanced feature) for purposes of cost optimization.

If the program code does not invoke any advanced processor features, then as shown in 660, one or more program execution servers may be selected from a fleet of program execution servers for execution of the program code. The selected server(s) may lack one or more advanced processor features offered by other servers in the fleet. Different servers in the fleet may be associated with different cost characteristics, and the server(s) may be selected based (at least in part) on cost optimization. For example, the selected server(s) may generally be less expensive to operate or maintain than other servers in the fleet (e.g., servers including processors offering advanced features). The server(s) may also be selected based (at least in part) on other suitable criteria, including availability, performance optimization, and/or client budget management. The client may not be informed of the type of server(s) selected for execution of the program code or the basis on which the server(s) are selected. As shown in 670, the program code may be sent or otherwise provided to the selected server(s) and executed using the selected server(s). Execution of the program code may be performed under circumstances indicated by the client, e.g., when triggered according to a schedule or by the occurrence of one or more events.

Figure 6B:
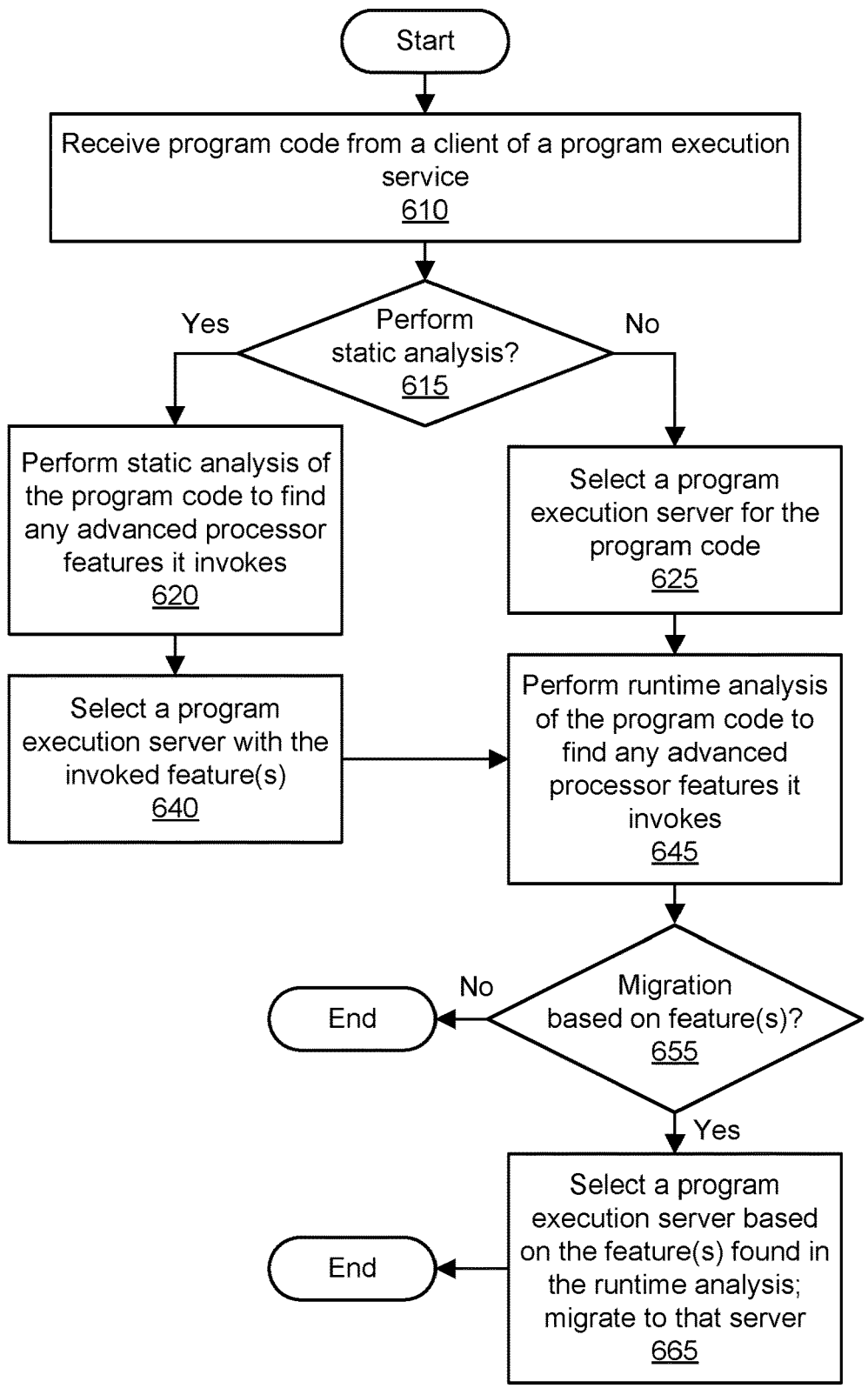

FIG. 6B is a flowchart illustrating a method for program code allocation based on processor features, including runtime analysis of processor features, according to one embodiment. As shown in 610, program code may be received by a program execution service from a client of the program execution service. The client may represent a customer (e.g., an individual or group) of a multi-tenant provider network that offers access to resources and services, such as the program execution service and associated computing resources. The client may intend that the program execution service execute the program code on behalf of the client using the computing resources (e.g., one or more program execution servers) associated with the program execution service. The client may use a client device to submit the program code to one or more computing devices associated with the program execution service. The program code may also be referred to herein as client code. The program code may be submitted using any suitable interface(s), including user interface(s) and/or programmatic interface(s) such as an application programming interface (API) to the program execution service. The client may also submit any other suitable instructions or metadata associated with the program code or its execution, such as an indication of circumstances under which the program code should be executed (e.g., events or schedules that may trigger execution of the code) and/or how many times the program code should be executed, an indication of a client account associated with the program code, access credentials associated with resources (e.g., storage resources) to be accessed by the program code, and so on. In one embodiment, the client may not submit additional information tending to indicate or identify the type of processor(s) on which the program code should be executed.

The program code may comprise one or more packages, files, or other units. Typically, the program code may include a set of program instructions in a binary format, e.g., as compiled for a target platform. However, the program code may also include higher-level portions that are not yet compiled and that the client expects the program execution service to compile and execute. The target platform may represent a set of hardware on which the program code is intended to be executed, e.g., including one or more particular processors or families of processors. The target platform may also represent a particular operating system or family of operating systems with which the program code is intended to be executed.

As shown in 615, it may be determined whether to perform static analysis of the program code. In one embodiment, the determination to perform static analysis may be made based (at least in part) on a configuration or other setting. For example, static analysis may or may not be a default associated with a particular client. In one embodiment, the determination to perform static analysis may be made based (at least in part) on input from the client who provides the program code. In one embodiment, the determination to perform static analysis may be made based (at least in part) on a budget associated with the client or other cost considerations.

If so, then as shown in 620, static analysis of program code may be performed to identify any advanced processor features that the code invokes. The static analysis may be performed prior to executing the program code on any of the computing devices associated with and managed by the program execution service. The advanced processor features, also referred to herein as processor features, may include any suitable features offered by any processors in the program execution servers managed by the program execution service. Typically, the processor features may include newer features in a family of processors, e.g., features that may not be found in all versions of a particular family of processors. Within the fleet of program execution servers managed by the program execution service, any of the advanced features sought by the static analysis may be present in one or more program execution servers and lacking in one or more program execution servers. The processors having advanced features may include one or more central processing units (CPUs), one or more graphics processing units (GPUs), one or more other co-processors, one or more hardware-based accelerators external to a CPU, one or more offload engines (e.g., a hardware security module, crypto-offload module, compression offload module, and so on), and/or other suitable elements of computing hardware. For example, advanced CPU features may include the Advanced Vector Extensions (AVX) to the x86 instruction set architecture (ISA), the related AVX2 or AVX-512 extensions, the Advanced Encryption Standard New Instructions (AES-NI) extension to the x86 ISA, and/or any other suitable extensions to existing ISAs. Each of the processor features may be associated with a particular instruction set. The static analysis may use disassembly techniques on the program code and attempt to find opcodes or other instructions in the instruction sets associated with any of the advanced processor features offered by the program execution servers. In this manner, the static analysis may determine whether the program code invokes one or more processor features, and if so, which processor features are invoked by the program code.

In the example shown in FIG. 6B, the static analysis may determine that the program code invokes one or more advanced processor features. Invoked features may not necessarily be used in any given execution of the program code, e.g., if the feature is invoked in a branch or path that is not always taken. Similarly, the program code may have been compiled such that it will successfully run on hardware having the advanced processor feature(s) or hardware lacking the advanced processor feature(s), although the program code may run more slowly in the latter case. However, the program code may generally be able to take advantage (under at least some circumstances that may potentially occur) of an advanced feature that it is said to invoke. As shown in 640, one or more program execution servers may be selected from a fleet of program execution servers for execution of the program code. The program execution servers may also be referred to as code execution servers. The server(s) may be selected based (at least in part) on the one or more processor features invoked by the program code, such that the selected server(s) may include hardware offering the one or more processor features invoked by the program code. As discussed above, one or more other program execution servers in the heterogeneous fleet may lack the one or more processor features invoked by the program code and may thus not be selected for execution of the program code. The server(s) may also be selected based (at least in part) on other suitable criteria, including availability, performance optimization, cost optimization, and/or client budget management. The client may not be informed of the type of server(s) selected for execution of the program code or the basis on which the server(s) are selected.

If static analysis is not performed, then as shown in 625, a program execution server may be selected for execution of the program code without the benefit of the static analysis. The server may be selected based on any suitable criteria, including availability, performance, cost, and so on. In one embodiment, if static analysis is not performed, then the program code may be allocated by default to a relatively-feature rich server, e.g., a server with hardware that offers many advanced processor features.

As shown in 645, the program code may be executed on the server selected in 640 or 625, and runtime analysis may be performed to identify any advanced features actually invoked by the program code during its execution. Any suitable techniques may be used in the runtime analysis, including monitoring which opcodes from instruction sets associated with advance features (if any) are actually executed. Execution of the program code may be performed under circumstances indicated by the client, e.g., when triggered according to a schedule or by the occurrence of one or more events. The execution of the program code may or may not actually invoke any of the advanced processor features of the one or more selected program execution servers. For example, features invoked in the program code may not necessarily be used in any given execution of the program code, e.g., if the feature is invoked in a branch or path that is not always taken.

As shown in 655, it may be determined whether to migrate the program code to another program execution server. For example, if static analysis was performed, then migration may be desired if the runtime analysis (after a suitably large number of executions) did not detect the invocation of a particular advanced feature that was found in static analysis of the program code. As another example, if static analysis was not performed, then migration may be desired if the program code was initially allocated to a relatively feature-rich server but if runtime analysis determined (after a suitably large number of executions) that not all of the advanced features were actually used by the program code. As shown in 665, if migration is desired, then a program execution server may be selected for the program code based on the feature(s) (if any) found in the runtime analysis, and the code may be migrated to that server. Any suitable techniques may be used to perform the migration, including a live migration functionality offered by a provider network. The target server for the migration may offer additional advanced processor features or fewer advanced processor features than the server selected in 640 or 625. Typically, the target server for the migration may offer fewer advanced features than the originally selected server. The server(s) may be selected based (at least in part) on any suitable criteria, including the processor features it offers, cost optimization, availability, performance optimization, and/or client budget management. For example, if an advanced feature is never actually invoked, then the program code may be migrated to a less expensive server (that lacks the advanced feature) for purposes of cost optimization. In one embodiment, migration may be performed more than once for a particular set of program code. In this manner, runtime analysis with migration may be used to control costs in a provider network.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of program execution servers comprising a plurality of processor features, wherein a first subset of the program execution servers comprises a particular processor feature, and wherein a second subset of the program execution servers lacks the particular processor feature; and
   one or more computing devices configured to implement a program execution service, wherein the program execution service is configured to:
      receive program code from a client of the program execution service;
      perform, by the program execution service, static analysis of the program code, wherein the static analysis determines that the program code when executed on at least one given processor invokes the particular processor feature;
      select one or more of the program execution servers of the first subset based at least in part on the determination that the program code when executed invokes the particular processor features, wherein the one or more selected program execution servers comprise the particular processor feature, and wherein other program code that does not invoke the particular processor feature is allocated to an additional one or more of the program execution servers of the second subset that lack the particular processor feature; and
      cause execution of the program code using the one or more selected program execution servers, wherein the execution of the program code invokes the particular processor feature of the one or more selected program execution servers.

2. The system as recited in claim 1, wherein the second subset of the program execution servers comprises an additional processor feature, wherein the first subset of the program execution servers lacks the additional processor feature, and wherein the program execution service is configured to:
   perform static analysis of additional program code, wherein the static analysis of the additional program code determines that the additional program code invokes the additional processor feature;
   select one or more of the program execution servers of the second subset based at least in part on the static analysis of the additional program code, wherein the one or more selected program execution servers of the second subset comprise the additional processor feature; and
   cause execution of the additional program code using the one or more selected program execution servers of the second subset, wherein the execution of the additional program code invokes the additional processor feature of the one or more selected program execution servers of the second subset.

3. The system as recited in claim 1, wherein the static analysis determines that the program code invokes the particular processor feature of a central processing unit (CPU) and an additional processor feature of a co-processor, and wherein each of the one or more selected program execution servers comprises the particular processor feature and the additional processor feature.

4. The system as recited in claim 1, wherein the particular processor feature comprises a feature of an accelerator external to a central processing unit.

5. A computer-implemented method, comprising:
   performing, by one or more computing devices that collectively implement a program execution service:
      performing analysis of program code by the program execution service, wherein the analysis determines one or more processor features invoked by the program code when executed on at least one given processor;
      selecting one or more program execution servers from a plurality of program execution servers based at least in part on the determination of the one or more processor features invoked by the program code when executed on at least one given processor, wherein the one or more selected program execution servers comprise the one or more processor features invoked by the program code, and wherein other program code that does not invoke the one or more processor features is allocated to an additional one or more of the program execution servers that lack the one or more processor features invoked by the program code; and
      causing execution of the program code using the one or more selected program execution servers.

6. The method as recited in claim 5, wherein the one or more processor features invoked by the program code comprise a feature of a central processing unit.

7. The method as recited in claim 5, wherein the one or more processor features invoked by the program code comprise a feature of a graphics processing unit.

8. The method as recited in claim 5, wherein the one or more processor features invoked by the program code comprise a feature of an accelerator external to a central processing unit.

9. The method as recited in claim 5, wherein the analysis comprises static analysis that finds one or more opcodes associated with the one or more processor features invoked by the program code.

10. The method as recited in claim 5, further comprising:
    performing analysis of additional program code, wherein the analysis of the additional program code determines no advanced processor features invoked by the additional program code; and
    allocating the additional program code to one or more of the program execution servers based at least in part on cost optimization.

11. The method as recited in claim 5, wherein the execution of the program code invokes the one or more processor features of the one or more selected program execution servers.

12. The method as recited in claim 5, wherein the analysis determines that the program code invokes a particular processor feature of a central processing unit (CPU) and an additional processor feature of a co-processor, and wherein each of the one or more selected program execution servers comprises the particular processor feature and the additional processor feature.

13. The method as recited in claim 5, wherein the analysis comprises runtime analysis.

14. The method as recited in claim 5, wherein execution of the program code comprises partitioning of the program code among a plurality of processors, and wherein the partitioning is performed based at least in part on the one or more processor features offered by the processors.

15. A non-transitory computer-readable storage medium storing program instructions computer-executable to perform:
  performing static analysis of client code by a program execution service, wherein the static analysis determines one or more processor features invoked by the client code when executed on at least one given processor;
  selecting one or more code execution servers from a fleet of code execution servers based at least in part on the determination of the one or more processor features invoked by the client code when executed on at least one given processor, wherein the one or more selected code execution servers comprise the one or more processor features invoked by the client code, and wherein other client code that does not invoke the one or more processor features is allocated to an additional one or more of the code execution servers that lack the one or more processor features invoked by the client code; and
  causing execution of the client code using the one or more selected code execution servers.

16. The non-transitory computer-readable storage medium as recited in claim 15, wherein the one or more processor features invoked by the client code comprise a feature of a central processing unit.

17. The non-transitory computer-readable storage medium as recited in claim 15, wherein the one or more processor features invoked by the client code comprise a feature of a graphics processing unit.

18. The non-transitory computer-readable storage medium as recited in claim 15, wherein the one or more processor features invoked by the client code comprise a feature of an accelerator external to a central processing unit.

19. The non-transitory computer-readable storage medium as recited in claim 15, wherein the static analysis finds one or more opcodes associated with the one or more processor features invoked by the client code.

20. The non-transitory computer-readable storage medium as recited in claim 15, wherein the program instructions are further computer-executable to perform:
  performing static analysis of additional client code, wherein the static analysis of the additional client code determines no processor features invoked by the additional client code; and
  allocating the additional client code to one or more of the code execution servers based at least in part on cost optimization.

* * * * *